United States Patent
Monzel et al.

(10) Patent No.: US 8,881,647 B2
(45) Date of Patent: Nov. 11, 2014

(54) METHOD OF REDUCING THE VOLUME OF A NON-RETURNABLE BLOW-MOLDED BREWERY-SPECIFIC BEER KEG AND OTHER NON-RETURNABLE CONTAINERS

(75) Inventors: Alois Monzel, Mörstadt (DE); Thomas Stienen, Dortmund (DE)

(73) Assignee: KHS GmbH, Dortmund (DE)

(*) Notice: Subject to any disclaimer, the term of this patent is extended or adjusted under 35 U.S.C. 154(b) by 993 days.

(21) Appl. No.: 12/359,540

(22) Filed: Jan. 26, 2009

(65) Prior Publication Data
US 2009/0206505 A1 Aug. 20, 2009

Related U.S. Application Data

(63) Continuation-in-part of application No. PCT/EP2007/006319, filed on Jul. 17, 2007.

(30) Foreign Application Priority Data

Jul. 24, 2006 (DE) .......................... 10 2006 034 638

(51) Int. Cl.
*B30B 9/32* (2006.01)
*B29B 17/00* (2006.01)
*B67D 1/08* (2006.01)

(52) U.S. Cl.
CPC .......... *B29B 17/0052* (2013.01); *B67D 1/0835* (2013.01); *B30B 9/321* (2013.01); *Y10S 100/902* (2013.01)
USPC ................................ 100/35; 100/90; 100/902

(58) Field of Classification Search
USPC ......... 100/35, 90, 269.01, 902, 299; 141/7, 8, 141/12, 65, 98; 53/434, 510, 512; 99/472
See application file for complete search history.

(56) References Cited

U.S. PATENT DOCUMENTS

| | | | | |
|---|---|---|---|---|
| 2,357,879 A | * | 9/1944 | De Berg, Jr. .................. | 156/382 |
| 3,351,370 A | * | 11/1967 | Olson ........................... | 294/186 |
| 3,861,569 A | * | 1/1975 | Johnston ..................... | 222/400.7 |
| 5,511,692 A | * | 4/1996 | Willingham .................. | 222/1 |
| 6,305,441 B1 | * | 10/2001 | Till .............................. | 141/90 |
| 6,799,506 B2 | * | 10/2004 | Tarlow .......................... | 99/472 |
| 7,395,755 B1 | * | 7/2008 | Deese .......................... | 100/35 |

FOREIGN PATENT DOCUMENTS

| | | |
|---|---|---|
| AT | 500 780 | 3/2006 |
| DE | 197 30 720 | 1/1999 |
| DE | 299 18 785 | 1/2000 |
| DE | 101 38 365 | 2/2003 |
| DE | 20 2006 000865 | 4/2006 |
| EP | 06 41 736 | 3/1995 |
| JP | 10 329138 | 12/1998 |
| JP | 3055728 U | 1/1999 |
| JP | 2000 005729 | 1/2000 |

(Continued)

OTHER PUBLICATIONS

International Search Report PCT/EP2007/006319 and English translation thereof, Mar. 2009.

(Continued)

*Primary Examiner* — Jimmy T Nguyen
(74) *Attorney, Agent, or Firm* — Nils H. Ljungman & Associates

(57) ABSTRACT

A method of reducing the volume of a non-returnable blow-molded brewery-specific beer keg and other non-returnable containers.

20 Claims, 11 Drawing Sheets

(56) References Cited

FOREIGN PATENT DOCUMENTS

| JP | 2001114239 A | * | 4/2001 |
| JP | 2001-269799 A | | 10/2001 |
| JP | 2002 126898 | | 5/2002 |
| JP | 2002 172493 | | 6/2002 |
| WO | WO 2005/032789 | | 4/2005 |

OTHER PUBLICATIONS

International Preliminary Report on Patentability PCT/EP2007/006319 and English translation thereof, Mar. 2009.

* cited by examiner

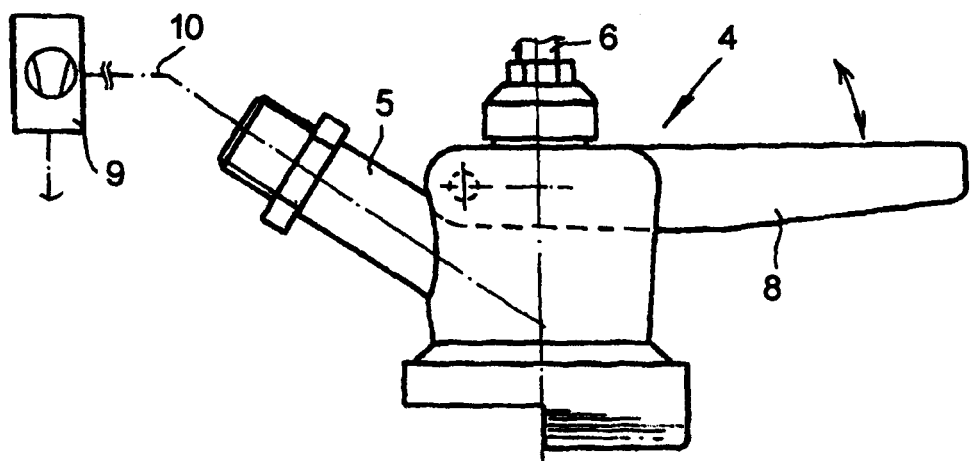
FIG. 3
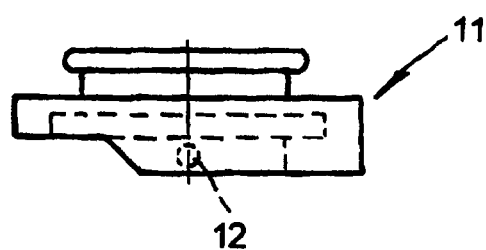
FIG. 4
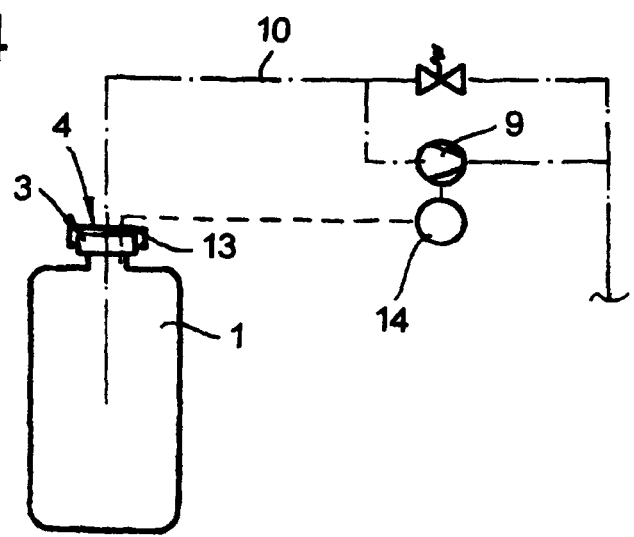

METHOD OF REDUCING THE VOLUME OF A NON-RETURNABLE BLOW-MOLDED BREWERY-SPECIFIC BEER KEG AND OTHER NON-RETURNABLE CONTAINERS

CONTINUING APPLICATION DATA

This application is a Continuation-In-Part application of International Patent Application No. PCT/EP2007/006319, filed on Jul. 17, 2007, which claims priority from Federal Republic of Germany Patent Application No. 10 2006 034 638.6, filed on Jul. 24, 2006. International Patent Application No. PCT/EP2007/006319 was pending as of the filing date of this application. The United States was an elected state in International Patent Application No. PCT/EP2007/006319.

BACKGROUND

1. Technical Field

The present application relates to a method for the reduction of the volume of non-returnable containers, in one possible embodiment non-returnable beverage containers, according to which a vacuum device is connected to an opening of the non-returnable container and evacuates the non-returnable container to reduce its volume.

2. Background Information

Background information is for informational purposes only and does not necessarily admit that subsequently mentioned information and publications are prior art.

Some methods relate to a bottle receptacle by means of which non-returnable beverage bottles are evacuated. For this purpose, this method is based on a conventionally, commercially available household vacuum cleaner as a vacuum device. Although this method may be useful for the final consumer, it is not suitable for the processing of non-returnable kegs, for example, like the type used commercially in the restaurant or food-service industry.

Non-returnable containers are generally used for the storage of foods and beverages, for example beer. In contrast to these kegs, which were made of materials such as aluminum or steel, for example, non-returnable kegs of this type are made primarily of plastic and are filled once and are then disposed of.

In contrast, the conventional kegs made of aluminum or stainless steel are reusable and can be filled, cleaned and re-used multiple times. This type of operation often requires or desires extensive logistical measures as well as complex, expensive and time-consuming cleaning measures. The return transport for example is expensive, because the conventional kegs made of aluminum or steel each take up a great deal of space on the floor of a truck. Consequently non-returnable kegs represent a beneficial development because they do not need to be returned or may not need to be returned, but can be disposed of locally.

Currently, the volume of the non-returnable kegs described above is generally reduced manually, or other measures are employed to reduce the amount of waste they represent. In the past, however, such problems have been relatively peripheral because non-returnable kegs are not yet widely distributed. In the future, however, the increased use of such non-returnable kegs is expected, which means that adequate methods are required or desired to reduce the volume of waste they represent.

The technical problem addressed by the present application is to develop a method to reduce the volume of non-returnable containers to the extent that volume reduction can be achieved easily, quickly and economically. It must or should also be possible to employ the method universally.

OBJECT OR OBJECTS

To solve this technical problem the present application teaches that the vacuum device is connected to the opening by means of an interchangeable adapter.

SUMMARY

By means of the interchangeable adapter, it becomes possible to reduce the volume of completely different non-returnable containers using one and the same vacuum device. In fact, the adapter, together with a connector, generally also closes the opening of the non-returnable container in question. Consequently the adapter, and optionally the feed line and vacuum device as a unit, can remain unchanged and the adapter essentially ensures or promotes the respective fit with the non-returnable container to be evacuated. In this context the present application teaches that the replaceable adapter, together with the connector, is connected to a flange in the opening of the non-returnable container.

The adapter can thereby be interchangeably connected with the connector and/or with the flange by means of a coupling or a quick-release coupling. In each case, the adapter takes into consideration different openings and/or flanges in the respective opening of the non-returnable container because the adapter essentially ensures or promotes the transition from the different individual openings or of the varying flange to the connector piece, which stays the same.

This method can be applied to non-returnable beverage containers, and in this case, non-returnable kegs. That is because most of these non-returnable kegs have a brewery-specific opening that is designed to reliably prevent, restrict, and/or minimize the sale of products of other beverage producers or sellers in the bars and restaurants with which they frequently have a contractual arrangement. By means of the interchangeable adapter, the different openings and/or flanges on the openings and the same connector piece, including the vacuum device, can be connected so that the unit comprising the connector and optionally the feed line and vacuum device can be used for a variety of types of kegs and products. That is true even if the non-returnable containers in question are filled and shipped housing not beer, for example, but wine, fruit juices or other soft drinks or foods in general.

One successful method of closing the containers is to close the opening of the non-returnable container after it has been evacuated. That can be accomplished, for example, by using a membrane, a sealing film, a film in general or a screw-on or bayonet closure. It is thereby essentially ensured or promoted that the evacuated non-returnable container is put into its flat and generally plate-shaped form for subsequent disposal and therefore represents the smallest possible volume of trash. As used in the context of this present application, the term "evacuation" means that the interior of the non-returnable container, the volume of which is to be reduced, is brought to a pressure that is (significantly) lower than the external atmospheric pressure. Consequently the (higher) external environmental pressure compresses the non-returnable container, which is generally made of a collapsible or elastic plastic material, so that upon the completion of the procedure described above the container has a nearly disc-like shape with a significantly reduced volume.

To control the process of evacuation and optionally to monitor the evacuation process, in one possible embodiment a sensor is provided which can be located in the vicinity of the opening of the non-returnable container. By means of the sensor, the pressure/vacuum in the non-returnable container is measured. The sensor controls the vacuum device as a function of the measurement results. It is conceivable, for example, to actuate the vacuum device until a certain specified pressure/vacuum in the non-returnable container in question is achieved. However, a timer can also be provided, and in one possible embodiment such that the vacuum apparatus is actuated for a specified period of time to achieve the necessary or desired vacuum in the interior of the non-returnable container. Generally the sensor is connected to a control unit which actuates the vacuum device on the basis of sensor signals or measurement signals, as described above.

An additional object of the present application is an apparatus for the reduction of the volume of non-returnable containers, in one possible embodiment of non-returnable beverage containers such as non-returnable kegs or similar containers. The apparatus in question is suitable for the performance of the method described in this application, although it is by no means limited to this method. An additional object of the present application is the use of a vacuum apparatus for the evacuation of the non-returnable kegs in question. The vacuum apparatus can—but does not have to—be equipped with the connector and the interchangeable adapter.

Consequently, a method and an apparatus are described, by means of which the volume of waste accounted for by non-returnable containers can be significantly reduced, and in one possible embodiment for a plurality of such non-returnable containers. The present application is based on an interchangeable adapter which essentially ensures or promotes the connection with the individual non-returnable container of a standardized connector which is connected to the vacuum device. The optional sealing of the opening that occurs after the evacuation essentially ensures or promotes that the minimum waste volume achieved is preserved.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is explained in greater detail below on the basis of a single possible embodiment which is illustrated in the accompanying drawings, in which:

FIG. 3 shows an adapter including the associated interchangeable adapter;

FIG. 4 is a schematic illustration of the entire apparatus for the reduction of the volume of the non-returnable container illustrated in FIG. 1;

DESCRIPTION OF EMBODIMENT OR EMBODIMENTS

The figures illustrate an apparatus by means of which the volume of non-returnable containers 1, in one possible embodiment non-returnable kegs 1, is reduced. The non-returnable keg 1 in question has a cylindrical surface which is made of an elastic and collapsible plastic of a sufficient material thickness to hold a liquid such as beer, for example. The non-returnable keg 1 can be manufactured by a plastic blow molding process and when filled assumes the shape of an approximately cylindrical pressure bag.

Figure 1:
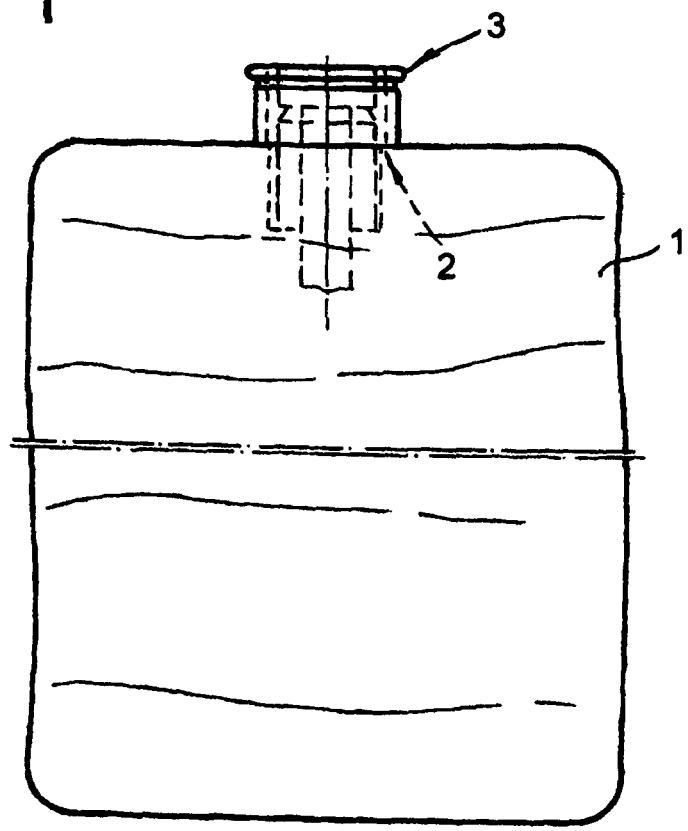
FIG. 1 shows a non-returnable container in the form of a non-returnable keg with an associated flange in its opening.
Figure 1A:
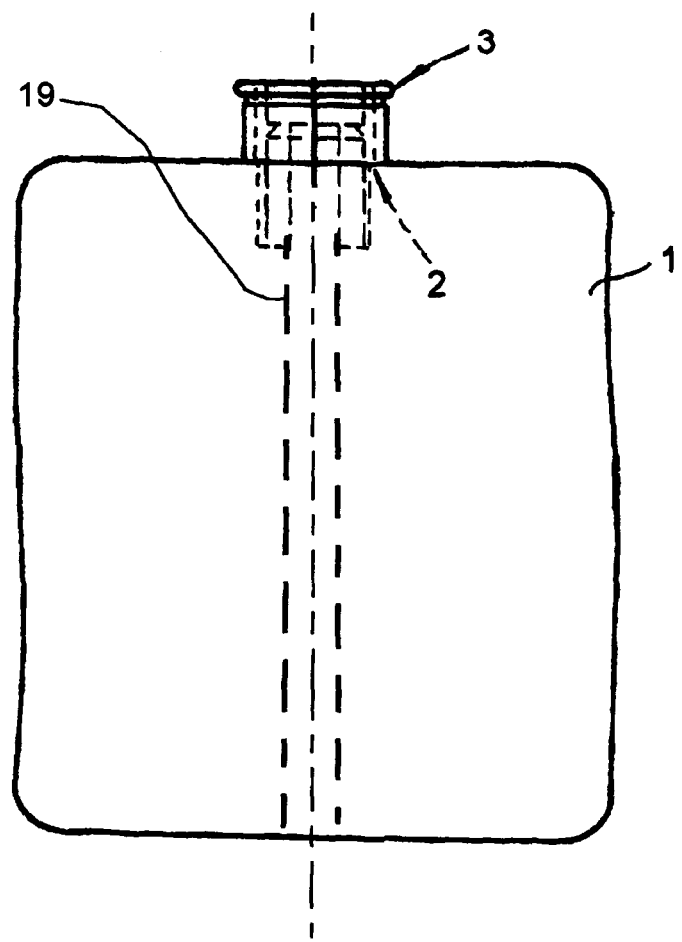
FIG. 1A shows a non-returnable keg with a tube that extends from the keg fitting or tapping head to the bottom of the keg.

FIG. 1A shows one possible embodiment of a non-returnable keg 1 for use with the present application. The non-returnable keg 1 comprises a brewery-specific keg fitting, tapping head, and/or keg flange 3, an opening 2, and a tube 19, which extends from the keg fitting, keg tapping head and/or keg flange 3 and the opening 2 down into the non-returnable keg 1 to the bottom of the non-returnable keg 1.

Figure 2:
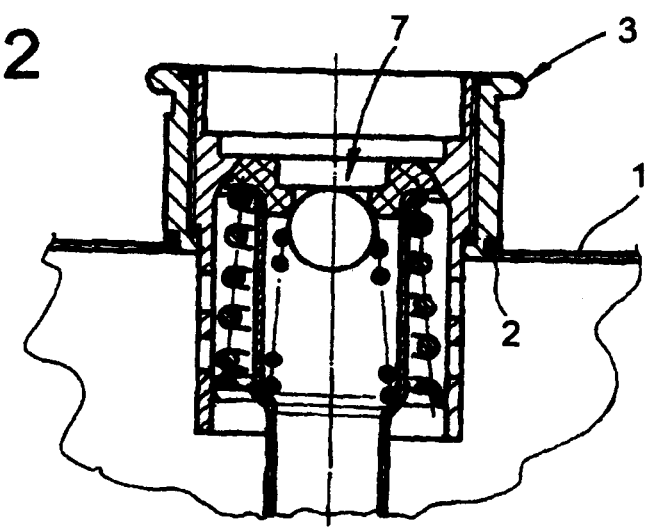
FIG. 2 shows the flange in cross section.

An opening 2 of the non-returnable keg 1 is equipped with a flange 3 which is visible in FIGS. 2 and 3 and/or a corresponding fitting or tapping head. A control unit or connector 4 which is illustrated in detail in FIG. 3 can be connected with the flange, and in the context of the present application represents a (vacuum) tap or a comparable device. By means of this tap or control unit or connector 4, the food or beverage inside the non-returnable keg 1 can be forced out. For this purpose the control unit or connector 4 has a connector bushing 5 to which a gas source, such as a $CO_2$ source, for example, can be connected. The interior of the non-returnable keg 1 is pressurized by means of this gas source so that the liquid it houses is discharged from the non-returnable keg 1 via a tube 6 of the control unit or connector 4. For this purpose it is necessary or desired to push down or open a valve 7 on the top of the flange 3 using a lever 8 on the connector piece 4.

In another possible embodiment according to the present application, the gas source is not limited to $CO_2$. The gas source could comprise any gas such as air or any combination of gases.

In at least one possible embodiment according to the present application, an air pump could be used instead of a gas source.

Actually, the above mentioned lever 8 in or on the control unit or connector 4 actuates a pin (not shown) in the control unit or connector 4 which for its part opens the valve 7 as soon as the lever 8 is depressed. The liquid in the keg is pushed outward by the pressure from the gas source which is present at the connection bushing 5 via the tube 6 of the connector piece 4. FIGS. 1 and 2, however, show that the tube 6 in question is hydraulically connected on the bottom with an additional tube 19 which is immersed in the liquid so that the emptying of the non-returnable keg 1 described above takes place via the control unit or connector 4.

In at least one possible embodiment according to the additional tube 19 which is immersed in the liquid is similarly made of a collapsible or elastic plastic material, so that the tube collapses as the non-returnable keg 1 is evacuated of air and thus collapsed.

After the non-returnable keg 1 has been emptied by means of the $CO_2$ gas which is present at an overpressure, the non-returnable keg 1 must or should be disposed of. For this purpose, the connector piece 4 or its connector bushing 5 is connected to a vacuum device 9, as a result of which the interior of the non-returnable keg 1 is evacuated. The connector bushing 5 as well as the connector piece 4 therefore perform a dual function, i.e. on one hand the emptying of the liquid present in the non-returnable keg 1 and on the other hand the evacuation of the non-returnable keg 1 or its disposal.

The vacuum device 9 can be a small vacuum pump which is prepared directly for the connection with the connector bushing 5 or is in communication with the connector bushing 5 by means of a feed line 10. It is also conceivable for the connector piece 4 and the vacuum device 9 to form a single assembly because the vacuum device 9 is flange-mounted directly on the connector bushing 5.

In one possible embodiment of the present application the control unit or connector 4 is connected by means of an interchangeable adapter 11 to the flange or the fitting or tapping head 3 in the opening 2 of the non-returnable keg 1. The adapter 11 overall essentially ensures or promotes that the vacuum device in question is in sealed communication with the above mentioned opening 2 or is connected to the opening 2.

Overall, the interchangeable adapter 11, together with the control unit or connector 4, essentially ensures or promotes the tight closure of the opening 2.

In this context, it can also be possible if, in an expanded application of this present application, the control unit or connector 4 is inserted not only for the evacuation of the non-returnable keg 1, but also for the above mentioned emptying of the non-returnable keg 1. In other words, one and the same control unit or connector 4 is used for the extraction of the food or beverage from the non-returnable keg 1 and its evacuation for the reduction of its volume, and enters into a sealed connection with the opening 2 of the non-returnable keg 1 with the interposition of the interchangeable adapter 11.

Because openings with different shapes and/or opening cross sections of the opening 2 can be connected using the interchangeable adapter 11, the present application makes it possible to use a standardized control unit or connector 4, also including a standardized vacuum device 9. The adaptation required or desired is the replacement of the respective adapter 11, which is adapted in a mechanically coded fashion to the shape of the flange 3 on the opening 2 of the non-returnable keg 1.

To guarantee or essentially guarantee the replacement of the interchangeable adapter 11, the adapter 11 can be equipped with the illustrated coupling 12 or quick-release coupling. The present application also teaches that the adapter 11 in question is connected on one hand to the control unit or connector 4 and on the other hand to the flange 3, detachably in each case. In each case, the vacuum device 9 essentially ensures or promotes that the non-returnable keg 1 is evacuated after it has been emptied and consequently—as described above—collapses as a result of the atmospheric pressure and the instability of its form. In the ideal case, the non-returnable keg 1 forms a flat disc for its subsequent disposal that can be handled and stored easily and can be disposed of economically.

In other words and in accordance with at least one possible embodiment of the present application, the control unit or connector 4 is configured to be connectable with a plurality of different, brewery-specific interchangeable adapters 11, each of which interchangeable adapter 11 is configured to be connectable with an opening 2 and flange 3 of a different non-returnable keg 1.

In at least one possible embodiment according to the present application, the control unit or connector 4 is attached with an interchangeable adapter 11 to form a non-returnable blow-molded brewery-specific beer keg volume-reducing device.

Since each brewery uses brewery-specific keg fittings, flanges 3, and non-returnable kegs 1 which are different from every other brewery, a different interchangeable adapter 11 is desired to fit each brewery-specific fitting, flange 3, and/or non-returnable keg 1 in order to sufficiently expel the liquid from the non-returnable keg 1 and collapse the non-returnable keg 1.

Figure 3A:
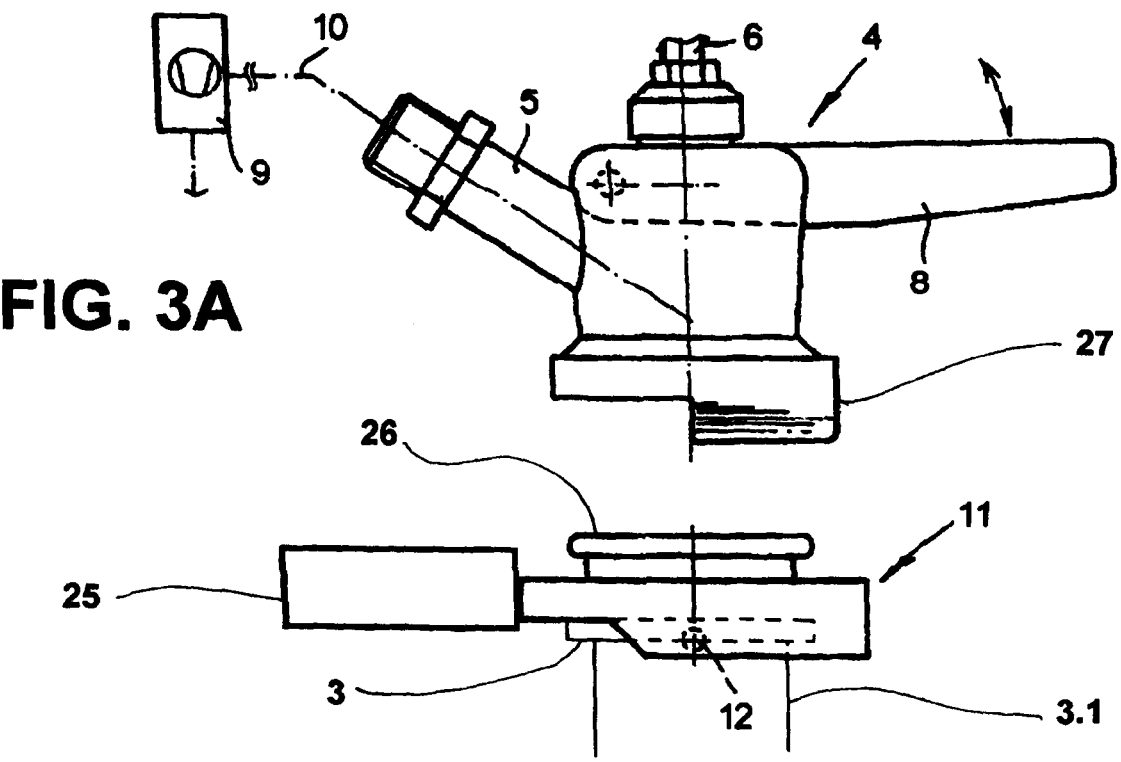
FIG. 3A shows another possible embodiment of the connector and an associated interchangeable adapter which is configured to be connectable with the connector.

FIG. 3A shows an embodiment of the present application of the control unit or connector 4 and interchangeable adapter 11, which is similar to the embodiment seen in FIG. 3. In FIG. 3A, the standard control unit or connector 4 comprises a standard connecting structure 27. The interchangeable adapter 11 comprises a standard connecting structure 26, which is configured to be connectable to the standard connecting structure 27 of the control unit or connector 4.

In at least one possible embodiment of the present application, the standard connecting piece 27 is configured to accept the standard connecting piece 26 of an interchangeable adapter 11 by sliding the standard connecting piece 26 into the standard connecting piece 27. The standard connecting piece 27 of the control unit or connector 4 is configured to hold the standard connecting piece 26 of the interchangeable adapter 11 and keep the interchangeable adapter 11 in place until it is desired to disconnect or remove the interchangeable adapter 11 from the control unit or connector 4.

Each of the interchangeable adapters 11 comprises the standard connecting structure 26, so each interchangeable adapter 11 is configured to be connectable to the standard connecting structure 27 of the control unit or connector 4. In at least one possible embodiment according to the present application, the quick-release coupling 12 of each interchangeable adapter 11 is configured to be connectable to one type of brewery-specific keg fitting and/or brewery-specific keg flange 3. The interchangeable adapter 11 is configured to accept the keg flange 3 of a keg neck 3.1 by sliding the keg fitting and/or keg flange 3 into the interchangeable adapter 11, or in one embodiment the interchangeable adapter 11 is configured to slide onto the brewery-specific keg fitting and/or brewery-specific keg flange 3. The interchangeable adapter 11 is configured to hold the keg fitting and/or keg flange 3 of the non-returnable keg 1 and keep the non-returnable keg 1 in place until it is desired to disconnect or remove the non-returnable keg 1 from the interchangeable adapter 11, or until it is desired to disconnect or remove the interchangeable adapter 11 from the brewery-specific non-returnable keg 1.

In one possible embodiment of the present application, a portion of the interchangeable adapter 11 slides under the keg flange 3. The interchangeable adapter 11 therefore cups the brewery-specific flange 3.

Figure 10:
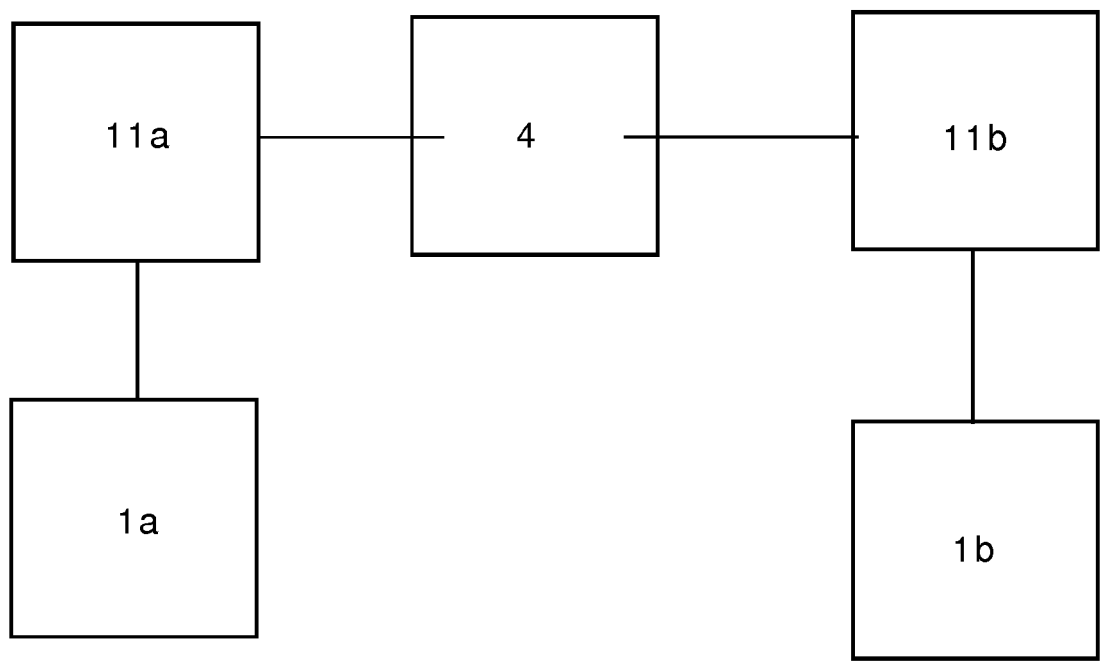
FIG. 10 shows a block diagram of an example of how kegs may be connected to a control unit or connector.

For example, according to the block diagram in FIG. 10, one interchangeable adapter 11a is configured to be connectable to one brewery-specific non-returnable keg 1a, and a second interchangeable adapter 11b is configured to be connectable to a second, different brewery-specific non-returnable keg 1b. To reduce the volume of a non-returnable keg 1a, the control unit or connector 4 is connected to an interchangeable adapter 11a. The interchangeable adapter 11a, which is now attached to the connector 4, is then connected to the non-returnable keg 1a. Once the non-returnable keg 1a is emptied of remaining liquid material and reduced in volume, the interchangeable adapter 11a and connector 4 are removed from the substantially disc-shaped non-returnable keg 1a. To then reduce the volume of a different, brewery-specific non-returnable keg 1b, the control unit or connector 4 is connected to an interchangeable adapter 11b. The interchangeable adapter 11b, which is now attached to the control unit or connector 4, is then connected to the different, brewery-specific non-returnable keg 1b. Once the non-returnable keg 1b is emptied of remaining liquid material and reduced in volume, the interchangeable adapter 11b and connector 4 are removed from the substantially disc-shaped non-returnable keg 1b.

FIG. 3A also shows a cassette 25, which is disposed on the interchangeable adapter 11. The cassette 25 holds seals, membranes, or other closures, each of which are configured to restrict and/or minimize air from re-entering a disc-shaped non-returnable keg 1 and therefore is configured to restrict and/or minimize the disc-shaped non-returnable keg 1 from expanding to form a substantially keg-shaped object. In other words, the membrane, seal, or other closure is configured to promote that a disc-shaped non-returnable keg 1 keeps a substantially disc-like shape and does not retake its prior shape of a keg.

In at least one possible embodiment, the cassette 25 is configured to dispense and adhere a seal, membrane, or other closure over the opening 2 of a non-returnable keg 1 as the interchangeable adapter 11 is disconnected or removed from the non-returnable keg 1. In other words, the seal, membrane, or other closure is attached to the opening 2 before the interchangeable adapter 11 is fully off the keg fitting and/or keg flange 3.

In at least one embodiment according to the present application, the cassette 25 and the seals or membranes within are wide enough to cover the span of the opening 2 and the keg flange 3. As the interchangeable adapter 11 is slid off the flange 3 of the non-returnable keg 1, the cassette 25 is moved over the opening 2 and flange 3 and a sealing membrane is attached to the top of the non-returnable keg 1, the flange 3, and/or the opening 2. The vacuum produced within the non-returnable keg 1 assists the attachment of the sealing membrane by sucking the sealing membrane from the cassette 25 to seal the opening 2.

Figure 3B:
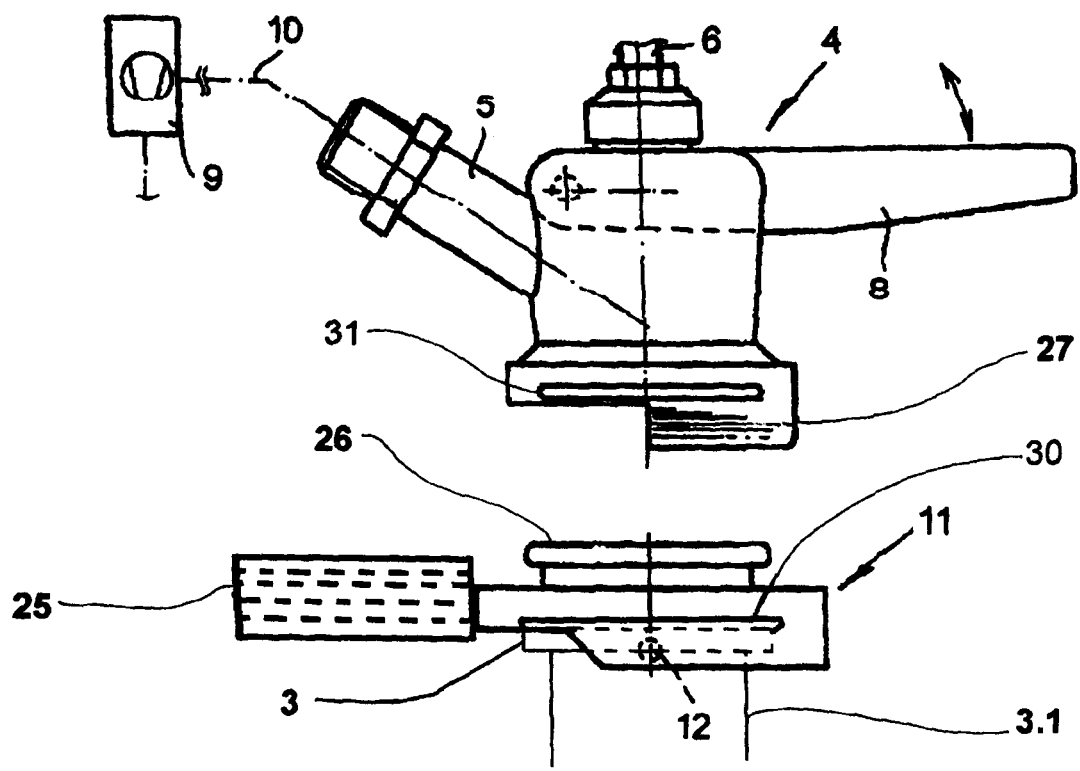
FIG. 3B shows an embodiment of the connector similar to that of FIG. 3A with additional rubber washers.

FIG. 3B shows an embodiment of the control unit or connector 4 of the present application, which is similar to that which is seen in FIGS. 3 and 3A. In FIG. 3B, the cassette 25 holds a plurality of sealing membranes to be adhered and/or attached to keg fittings and/or keg flanges 3 and/or openings 2 of non-returnable kegs 1.

Also illustrated in FIG. 3B are rubber washers 30 and 31, which are configured to help produce and promote a seals. The rubber washer 30, which is disposed in the interchangeable adapter 11, is configured to promote a sufficient seal between the interchangeable adapter 11 and the non-returnable keg 1 which is to be reduced in volume. The standard connecting structure 27 of the control unit or connector 4 also comprises a rubber washer 31 to promote a sufficient seal between the control unit or connector 4 and the interchangeable adapter 11.

FIG. 4 shows that a sensor 13 is provided in the vicinity of the opening 2 of the non-returnable keg 1. This sensor 13 projects into the interior of the non-returnable keg 1 where it measures the vacuum in the non-returnable keg 1. In the context of one possible embodiment, but without any restriction to this possible embodiment, the sensor 13 in question is integrated into the respective control unit or connector 4 because the control unit or connector 4 is retained as a standardized assembly for any number of potential applications. The sensor 13 is connected to a control unit 14 which receives and evaluates its sensor signals or measurements. The control unit 14 actuates the vacuum device as a function of the sensor signals, and for this purpose is connected electrically to the vacuum device 9.

In this case it is conceivable that, by means of the control unit 14, a specified vacuum is set in the interior of the non-returnable keg 1 and is then adjusted in the sense of an automatic control system by means of the vacuum device 9. It also goes without saying that it is within the teaching of the present application, depending on the characteristics of the non-returnable keg 1 to be evacuated, to work with different levels of vacuum. Simultaneously or alternatively, the duration of the evacuation of the non-returnable keg 1 by the vacuum device 9 can also be specified by means of the control unit 14.

Figure 4A:
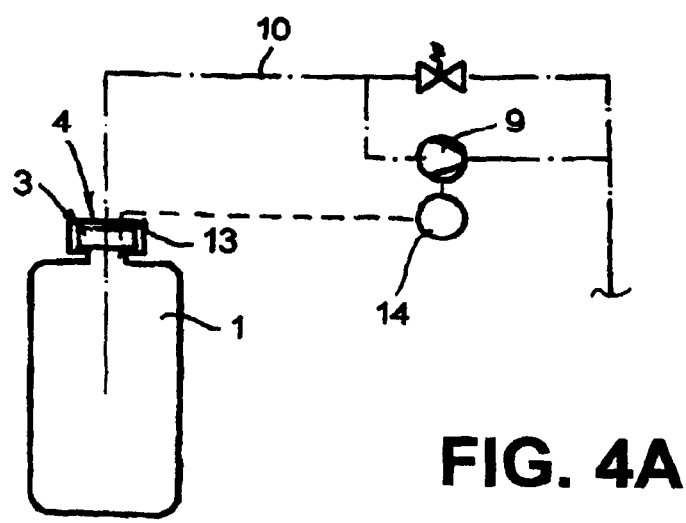
FIG. 4A shows another possible embodiment of the device of the present application for reducing the volume of a non-returnable keg.

FIG. 4A shows an embodiment of the present application similar to that which is seen in FIG. 4. In the embodiment illustrated in FIG. 4A, the control unit or connector 4 and associated interchangeable adapter 11 are configured to mechanically accept or surround all or substantially all or most of the keg fitting and/or keg flange 3 of the non-returnable keg 1. This embodiment promotes that a seal is produced between the interchangeable adapter 11 and the non-returnable keg 1 which is to be reduced in volume.

Additionally in at least one possible embodiment, the interchangeable adapter 11 comprises a rubber ring to promote a seal between the interchangeable adapter 11 and the non-returnable keg 1 which is to be reduced in volume. In another possible embodiment, the rubber ring is a rubber washer, which is configured to help produce and promote a seal between the interchangeable adapter 11 and the non-returnable keg 1 which is to be reduced in volume. The standard connecting structure 27 of the control unit or connector 4 can also comprise a similar rubber ring or rubber washer to promote a sufficient seal between the control unit or connector 4 and the interchangeable adapter 11.

Figure 5:
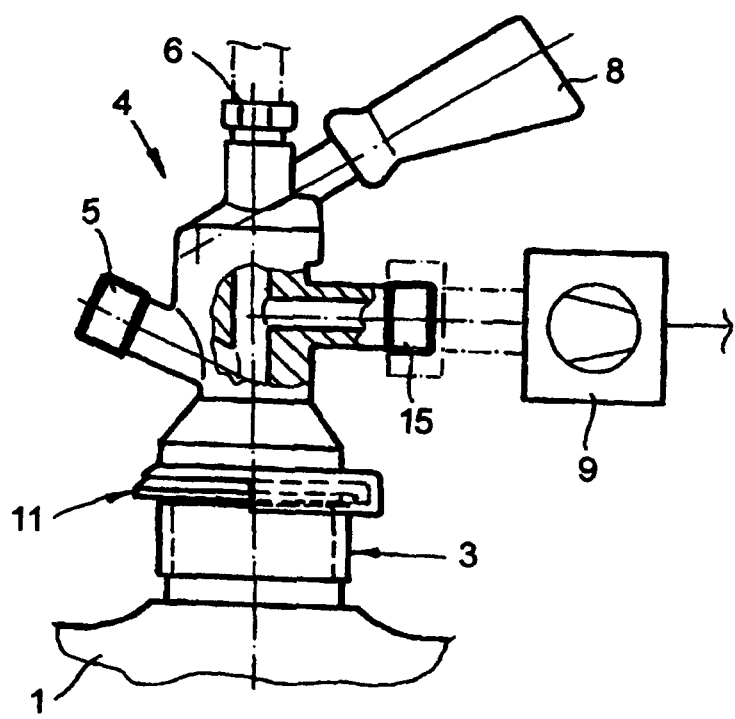
FIG. 5 shows a variant embodiment of the adapter illustrated in FIG. 3.

FIG. 5 is a simplified illustration of one variant of the possible embodiment illustrated in FIG. 3. The figure shows the connector or the tap 4 which can be actuated via the connector bushing 5 with pressure from the external gas source to expel the liquid which is present in the interior of the non-returnable keg 1. In addition to this connector bushing 5 and the lever 8, in this case there is an additional connector bushing 15 on which the vacuum device 9 can be directly flange-mounted, for example. In this case, the control unit or connector 4 and the vacuum device 9—optionally in connection with the interchangeable adapter 11—form a single assembly which is used directly and in its entirety as a closure for the opening 2 of the non-returnable keg 1. It is also within the teaching of this present application, however, if the connector bushing 15 which is located on the tap 4 and the vacuum device 9 are connected by means of an additional flexible line (not shown).

Figure 6:
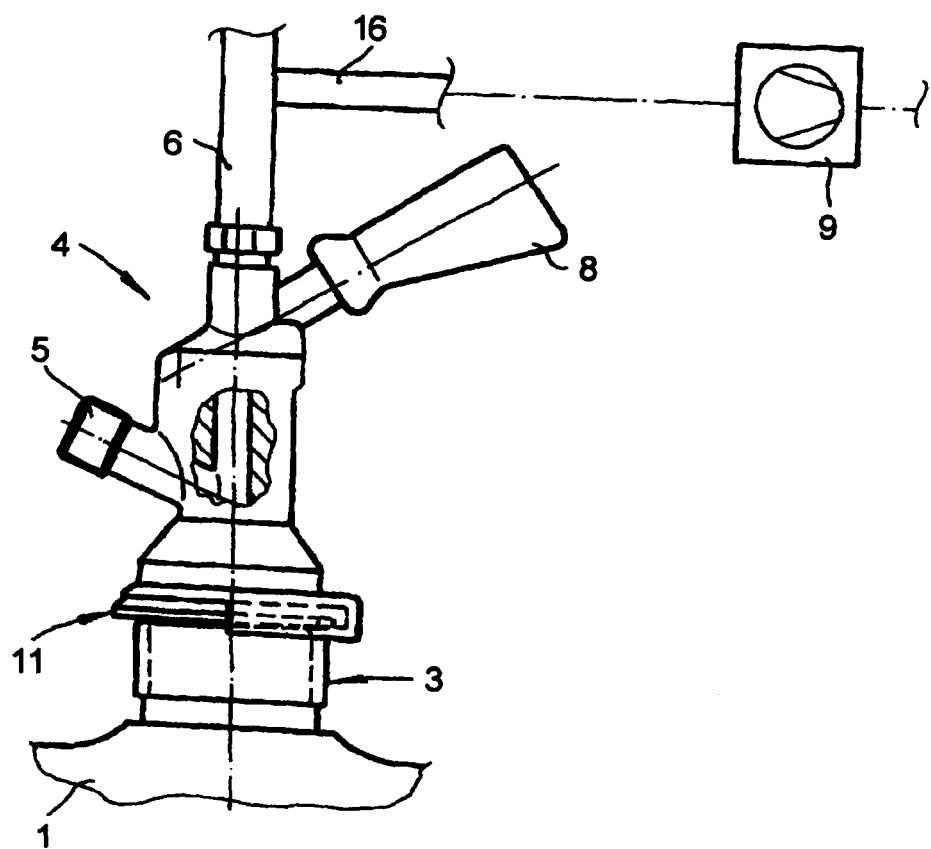
FIG. 6 shows an additional variant of the apparatus.

FIG. 6 illustrates an additional potential application or actuation variant with the vacuum device 9. In this case, the vacuum device 9 is connected to the tube 6 of the control unit or connector 4, for example, via a branch connection 16. In other words, the vacuum device 9 can be connected with the interior of the non-returnable keg 1 on one hand via the connector bushing 5 of the control unit or connector 4, which is present anyway, or on the other hand via an additional line (the connector bushing 15 and/or the branch connection 16). Consequently, a variety of different potential connections can be realized which utilize the outlets (connector bushing 5) or lines (tube 6 or product line) which are present in any case, or the coupling of the vacuum device 9 with the interior of the non-returnable keg 1 can be achieved by means of an additional connector (connector bushing 15; branch connection 16). It goes without saying that a combination of these variants is also conceivable and is within the teaching of the present application.

Figure 7:
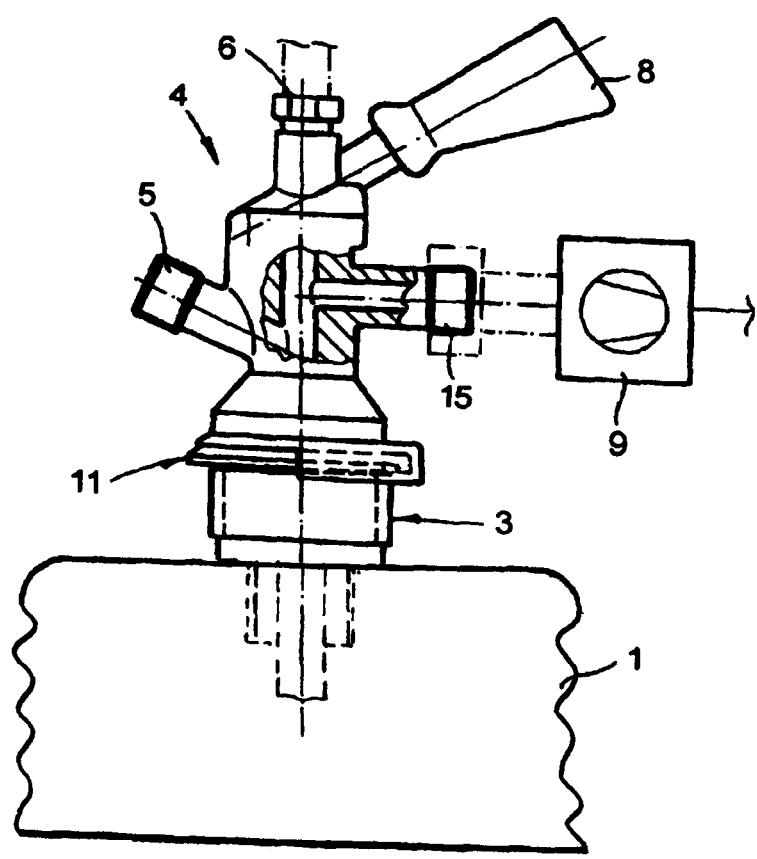
FIG. 7 shows the variant embodiment of the apparatus of FIG. 5 reducing the volume of a non-returnable keg.

FIG. 7 shows one possible embodiment of the apparatus of the present application, for example the embodiment illustrated in FIG. 5. In FIG. 7, the control unit or connector 4 is connected to the opening 2 of the non-returnable keg 1 by means of the interchangeable adapter 11. The non-returnable keg 1 has been emptied of any remaining liquid, and the vacuum device 9 is lowering the air pressure inside the non-returnable keg 1. The air pressure outside of the non-returnable keg 1 crushes the non-returnable keg 1, thereby reducing the volume of the non-returnable keg 1. As seen in FIG. 7, the bottom surface of the non-returnable keg 1 moves towards the opening 2 to create a substantially disc-shaped object to be disposed of economically.

Figure 8:
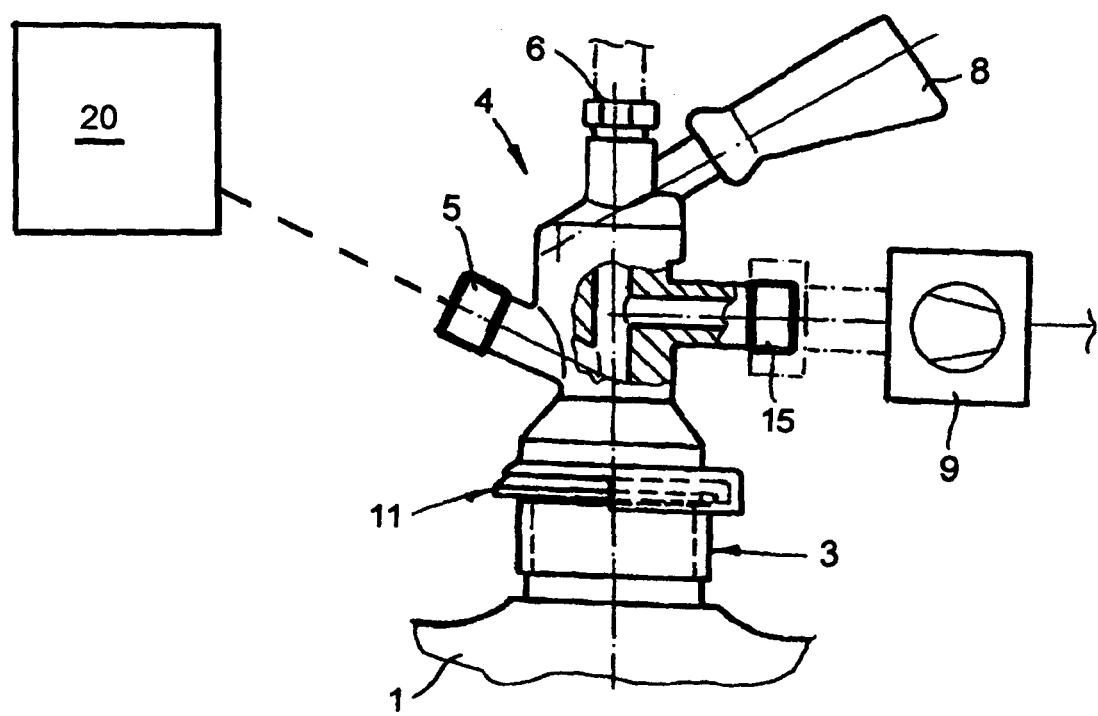
FIG. 8 shows the variant embodiment of the apparatus of FIG. 5 in addition with a gas source for emptying a non-returnable keg.

FIG. 8 shows one possible embodiment of the apparatus of the present application, for example the embodiment illustrated in FIG. 5, with an additional gas source 20. This gas source, in one possible embodiment, could be carbon dioxide gas. However, the gas source is not limited to carbon dioxide gas. The gas source 20 could be a tank of pressurized gas, which is connected to the control unit or connector 4 by the connector bushing 5. The gas from the gas source 20 empties the non-returnable keg 1 of any remaining liquid or other material by forcing the remaining liquid up the additional tube, which is part of the non-returnable keg 1 and extends from the bottom of the keg to the opening 2, and then through the tube 6 of the control unit or connector 4. The gas source 20 allows the control unit or connector 4 to clean out or substantially empty the non-returnable keg 1 so the non-returnable keg 1 can then be reduced in volume to a substantially disc-shaped object.

Of course it is also within the teaching of the present application to close the opening 2 of the non-returnable keg 1 after the evacuation. In this case the application of a sealing film, a membrane, a screw cap or bayonet closure is also conceivable. For this purpose, the control unit or connector 4 can be equipped with corresponding devices which are not illustrated in detail. In any case, this closure essentially ensures or promotes that the non-returnable keg 1 is closed gas-tight after its evacuation 2 at its opening 2, and therefore retains the collapsed shape achieved by the evacuation until it is disposed of.

Figure 9:
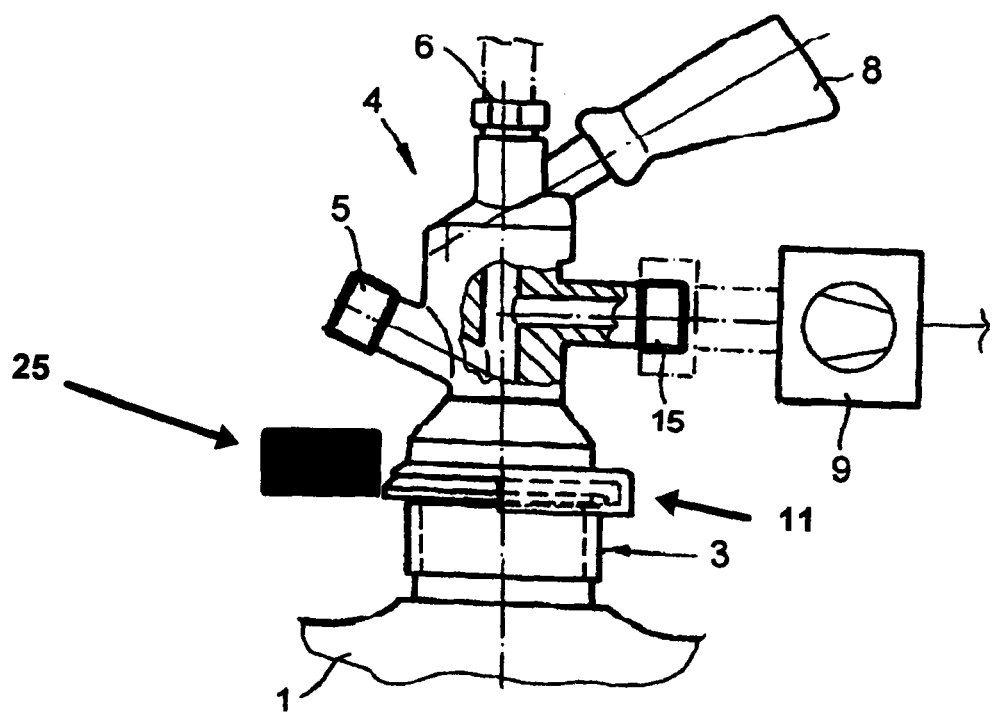
FIG. 9 shows the variant embodiment of the device of FIG. 5 in addition with a device for applying seals or membranes to non-returnable kegs.

FIG. 9 shows an embodiment of the present application which is similar to that which is seen in FIGS. 5, 7, and 8. This embodiment of the control unit or connector 4 also comprises a cassette 25. The cassette 25 is configured to dispense and adhere seals, membranes, or other closures which are configured to restrict and/or minimize air from re-entering a disc-shaped non-returnable keg 1 and therefore is configured to restrict and/or minimize the disc-shaped non-returnable keg 1 from expanding to form a substantially keg-shaped object. In other words, the membrane, seal, or other closure is configured to promote that a disc-shaped non-returnable keg 1 keeps a substantially disc-like shape and does not retake its prior shape of a keg.

In at least one possible embodiment, the cassette 25 is configured to dispense and adhere a seal, membrane, or other closure over the opening 2 of a non-returnable keg 1 as the interchangeable adapter 11 is disconnected or removed from the non-returnable keg 1. In other words, the seal, membrane, or other closure is attached to the opening 2 before the interchangeable adapter 11 is fully off the keg fitting and/or keg flange 3.

In another possible embodiment, the application of a membrane, sealing film, or other type of closure can be done manually. For example, the control unit or connector 4 can be removed from the non-returnable keg 1 while the operator stands on the non-returnable keg 1, so the non-returnable keg 1 does not begin to retake its full shape, and places a seal, membrane, or other closure on or over the opening 2. In another example, the operator of the control unit or connector 4 does not have to stand on the non-returnable keg 1, but instead can place the seal, film, membrane, on quickly after removal of the control unit or connector 4.

The objects of the present application are a method and an apparatus for the reduction of the volume of non-returnable containers 1, in one possible embodiment for the reduction of the volume of non-returnable beverage containers 1. A vacuum device 9 is thereby connected to an opening 2 of the non-returnable container 1 and evacuates the non-returnable container 1 to reduce its volume. The present application teaches that the vacuum device 9 is connected to the above mentioned opening 2 by means of an interchangeable adapter 11.

One feature or aspect of an embodiment is believed at the time if the filing of this patent application to possibly reside broadly in a method for the reduction of the volume of non-returnable containers 1, in one possible embodiment of non-returnable beverage containers 1, wherein a vacuum device 9 is connected to an opening 2 of the non-returnable container 1 and evacuates the non-returnable container 1 to reduce its volume, characterized in that the vacuum device 9 is connected to the opening 2 by means of an interchangeable adapter 11.

Another feature or aspect of an embodiment is believed at the time if the filing of this patent application to possibly reside broadly in the method, wherein the adapter 11, together with a control unit or connector 4, closes the opening 2.

Yet another feature or aspect of an embodiment is believed at the time if the filing of this patent application to possibly reside broadly in the method, wherein the opening 2 of the non-returnable container 1 is closed, e.g. by a membrane, after its evacuation.

Still another feature or aspect of an embodiment is believed at the time if the filing of this patent application to possibly reside broadly in the method, wherein the vacuum device 9 is controlled by means of a sensor 13 which measures the pressure/vacuum present in the non-returnable container 1.

A further feature or aspect of an embodiment is believed at the time if the filing of this patent application to possibly reside broadly in an apparatus for the reduction of the volume of non-returnable containers 1, in one possible embodiment of non-returnable beverage containers 1, in one possible embodiment for the performance of the method according to the present application, with a vacuum device 9 which is at least partly connected with the interior of the non-returnable container 1, which vacuum device 9 evacuates the non-returnable container 1 to reduce its volume, wherein the vacuum device 9 is connected with the connector by means of existing lines/connections 5; 6 and/or by means of at least one additional connector bushing 15.

Another feature or aspect of an embodiment is believed at the time if the filing of this patent application to possibly reside broadly in the apparatus, wherein it is a tap on the control unit or connector 4 for non-returnable kegs.

Yet another feature or aspect of an embodiment is believed at the time if the filing of this patent application to possibly reside broadly in the apparatus, wherein the vacuum device 9 is connected to the opening 2 by means of an interchangeable adapter 11.

Still another feature or aspect of an embodiment is believed at the time if the filing of this patent application to possibly reside broadly in the apparatus, wherein the adapter 11, together with the control unit or connector 4, is connected to a flange 3 in the opening 2 of the non-returnable container 1.

A further feature or aspect of an embodiment is believed at the time if the filing of this patent application to possibly reside broadly in the apparatus, wherein the adapter 11 is interchangeably connected by means of a coupling 12 with the control unit or connector 4 and/or the flange 3.

Another feature or aspect of an embodiment is believed at the time if the filing of this patent application to possibly reside broadly in the apparatus, wherein a sensor 13 is provided in the vicinity of the opening 2 of the non-returnable container 1 to measure the pressure/vacuum in the non-returnable container 1.

Yet another feature or aspect of an embodiment is believed at the time if the filing of this patent application to possibly reside broadly in the apparatus, wherein the sensor 13 is connected to a control unit 14 which actuates the vacuum device 9 on the basis of sensor signals.

Still another feature or aspect of an embodiment is believed at the time if the filing of this patent application to possibly reside broadly in a use of a vacuum device 9 optionally together with a control unit or connector 4 and an interchangeable adapter 11 for the evacuation of non-returnable beverage containers 1, in one possible embodiment non-returnable kegs 1.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of PET kegs or plastic kegs which may possibly utilized or adapted for use in at least one possible embodiment according to the present application may possibly be found in the following U.S. Pat. No. 7,188,751, having the title "DRINK DISPENSER ASSEMBLY AND CONTAINER FOR DRINK AND DRINK DISPENSING LINE," issued one Mar. 13, 2007; U.S. Pat. No. 5,129,534, having the title "COMPOSITE KEG," issued on Jul. 14, 1992; U.S. Pat. No. 6,666,358, having the title "BEER CONTAINER," issued on Dec. 23, 2003; and U.S. Pat. No. 4,867,348, having the title "DISPOSABLE PACKAGE FOR USE IN MARKETING FLUIDS," issued on Sep. 19, 1989.

Some examples of devices configured to seal containers and/or place membranes over container openings which may possibly be utilized or adapted for use in at least one possible embodiment of the present application may possibly be found in the following U.S. Pat. No. 7,364,779, having the title "EASY-OPENING HIGH BARRIER PLASTIC CLOSURE AND METHODS THEREFOR," published on Apr. 29, 2008; U.S. Pat. No. 6,883,689, having the title "METHOD AND DEVICE FOR CLOSING A CONTAINER AND ITS CONTAINER PROVIDED WITH THE SAME," published on Apr. 26, 2005; U.S. Pat. No. 5,071,667, having the title "METHOD OF PRESERVING FOODSTUFFS IN CUP-SHAPED CONTAINERS," published on Dec. 10, 1991; U.S. Pat. No. 7,454,884, having the title "APPLIANCE FOR VACUUM SEALING FOOD CONTAINERS," published on Nov. 25, 2008; U.S. Pat. No. 5,916,110, having the title "SYSTEM AND METHOD FOR SEALING CONTAINERS," published on Jun. 29, 1999; U.S. Pat. No. 7,278,439, having the title "SYSTEM AND METHOD FOR SEALING A TANK OPENING," published on Oct. 9, 2007; and U.S. Pat. No. 6,958,097, having the title "DEVICE FOR HOLDING AND VACUUM-SEALING A CONTAINER HAVING AN OPENING," published on Oct. 25, 2005.

U.S. patent application Ser. No. 12/209,407, filed on Sep. 12, 2008, having inventor Alois MONZEL, and title "METHOD AND DEVICE FOR THE MANUFACTURE OF DISPOSABLE, ONE-WAY, SINGLE-USE BEVERAGE KEGS FOR USE IN HOME BARS," and its corresponding Federal Republic of Germany Patent Application No. 10 2006 026 279.4, filed on Jun. 2, 2006, and International Patent Application No. PCT/EP2007/004600, filed on May 24, 2007, having WIPO Publication No. WO 2007/140884 and inventor Alois MONZEL are hereby incorporated by reference as if set forth in their entirety herein.

U.S. patent application Ser. No. 11/428,764, filed on Jul. 5, 2006, having inventor Alois MONZEL, and title "KEG FILLING PLANT FOR FILLING KEGS WITH A LIQUID BEVERAGE MATERIAL, SUCH AS BEER, WINE, SOFT DRINKS, OR JUICE, AND A METHOD OF OPERATING SAME, AND A HANDLING AND TREATMENT STATION FOR KEGS," and its corresponding U.S. Pat. No. 7,455,082, Federal Republic of Germany Patent Application No. 10 2005 031 573.9, filed on Jul. 5, 2005, and inventor Alois MONZEL are hereby incorporated by reference as if set forth in their entirety herein.

All of the patents, patent applications or patent publications, which were cited in the International Search Report dated Dec. 5, 2007, and/or cited elsewhere are hereby incorporated by reference as if set forth in their entirety herein as follows: DE 197 30 720, having the following German title "VORRICHTUNG ZUR DRUCKBEAUFSCHLAGUNG EINES ANGEBROCHENEN LEBENSMITTELBEHÄLTERS," published on Jan. 21, 1999; JP 10329138, having the following English translation of the Japanese title "AUXILIARY IMPLEMENT FOR COMPRESSING PET BOTTLE AND METHOD FOR COMPRESSING RECOVERED PET BOTTLE," published on Dec. 15, 1998; JP 2000 005729, having the following English translation of the Japanese title "NOZZLE FOR PET BOTTLE COMPRESSION," published on Jan. 11, 2000; JP 2002 172493, having the following English translation of the Japanese title "SUCTION NOZZLE FOR COMPRESSING PET BOTTLE," published on Jun. 18, 2002; JP 2002 126898, having the following English translation of the Japanese title "CRUSHING DEVICE FOR PET BOTTLE USING CLEANER," published on May 8, 2002; DE 20 2006 000 865 U1, having the following English translation of the German title "BOTTLE HOLDING PIECE FOR EVACUATION OF AIR FROM EMPTY DISPOSABLE DRINK BOTTLES HAS OPENING WHICH ACCOMMODATES STANDARD BOTTLE TOP WITH TIGHT SEALING FOR OPTIMUM BUILD-UA VACUUM," published on Apr. 20, 2006; WO 2005/032789, having the title "CONTAINER COMPRESSION," published on Apr. 14, 2005; and DE 101 38 365 A1, having the following English translation of the German title "DISPOSABLE KEG FOR ACCOMMODATION OF LIQUID FOOD PRODUCTS, IN PARTICULAR BEER, COMPRISES WELD SEAMS WHICH JOIN INDIVIDUAL KEG SECTIONS, AND ARE DISTANCED FROM THE KEG INTERIOR," published on Feb. 20, 2003.

All of the patents, patent applications or patent publications, which were cited in the German Office Action dated Apr. 5, 2007, and/or cited elsewhere are hereby incorporated by reference as if set forth in their entirety herein as follows: AT 500 780, having the title "REINIGUNGS U. STERILISIERADAPTER FÜR GETRANKESCHANKANLAGEN," published on Mar. 15, 2006; DE 299 18 785, having the following English translation of the German title "DEVICE FOR CLEANING A TAPPING HEAD ARRANGEMENT FOR TAPPING BEVERAGES PRESSURIZED BY GAS," published on Feb. 17, 2000; and EP 0 641 736, having the title "DISPENSING HEAD FOR SOFT DRINK AND CLEANING DEVICE FOR SOFT DRINK POURING SYSTEM," published on Mar. 8, 1995.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 034 638.6, filed on Jul. 24, 2006, having inventors Alois MONZEL and Thomas STIENEN, and DE-OS 10 2006 034 638.6 and DE-P S10 2006 034 638.6, and International Application No. PCT/EP2007/006319, filed on Jul. 17, 2007, having WIPO Publication No. WO 2008/012009 and inventors Alois MONZEL and Thomas STIENEN, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/006319 and German Patent Application 10 2006 034 638.6 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/006319 and DE 10 2006 034 638.6 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of reducing the volume of non-returnable beer kegs, said method comprising the steps of:
    using an interchangeable adapter to connect a vacuum arrangement to an opening of a non-returnable beer keg; and
    evacuating air from said non-returnable beer keg with said vacuum arrangement and thereby reducing the volume of said non-returnable beer keg and producing a volume-reduced non-returnable beer keg.

2. A method of reducing the volume of non-returnable beverage kegs, said method comprising the steps of:
    using an interchangeable adapter to connect a vacuum arrangement to an opening of a non-returnable beverage keg;
    evacuating air from said non-returnable beverage keg with said vacuum arrangement and thereby reducing the volume of said non-returnable beverage keg and producing a volume-reduced non-returnable beverage keg; and
    said vacuum arrangement comprises a vacuum device and a connector to connect said vacuum device and said interchangeable adapter, and said method further comprises using said connector and said interchangeable adapter to connect said vacuum device to said non-returnable beverage keg, and opening a valve in said non-returnable beverage keg with said connector to permit said step of evacuating air from said non-returnable beverage keg.

3. The method according to claim 2, wherein said method further comprises the step of closing an opening of a volume-reduced non-returnable beverage keg using a closure structure comprising one of: a sealing film, a membrane, a screw cap, and a bayonet closure.

4. The method according to claim 3, wherein said method further comprises the step of controlling said vacuum device by sensing the pressure in the non-returnable keg during evacuation of air therefrom.

5. An arrangement for performing the method of reducing the volume of non-returnable beverage kegs according to claim 2, said arrangement comprising:
    an interchangeable adapter being configured to connect a vacuum arrangement to an opening of a non-returnable beverage keg;
    a vacuum arrangement being configured to evacuate air from said non-returnable beverage keg with said vacuum arrangement to thereby reduce the volume of said non-returnable beverage keg and produce a volume-reduced non-returnable beverage keg;
    said vacuum arrangement comprising a vacuum device and a connector being configured to connect said vacuum device and said interchangeable adapter; and
    said vacuum device being connected to said connector by lines or connections on said connector and/or at least one additional connector bushing.

6. The arrangement according to claim 5, wherein said connector comprises a keg tap configured to open valves of non-returnable kegs.

7. The arrangement according to claim 6, wherein said interchangeable adapter is connectable to a flange around the opening of a non-returnable keg.

8. The arrangement according to claim 7, wherein said interchangeable adapter is connectable by a coupling to at least one of said connector and a flange around the opening of a non-returnable keg.

9. The arrangement according to claim 8, wherein said arrangement comprises a sensor configured to be disposed adjacent the opening of a non-returnable keg to measure the pressure or vacuum in a non-returnable keg, and said arrangement comprises a control unit connected to said sensor and configured to actuate said vacuum device on the basis of sensor signals.

10. The method according to claim 2, wherein said method comprises reducing the volume of commercial, restaurant or food service, non-returnable, plastic kegs.

11. The method according to claim 10, wherein said method further comprises using a kit comprising at least two different interchangeable adapters, and wherein said step of using said kit comprises:
    using a first type of interchangeable adapter for a first keg; and
    using a second type of interchangeable adapter for a second keg, wherein an opening of said first keg is different than an opening of said second keg.

12. The method according to claim 11, wherein said connector comprises a keg tap, and said step of using said connector comprises using a keg tap to connect said vacuum device and any one of said interchangeable adapters, and said keg tap is configured to permit the emptying of liquid present in a keg, and said method further comprises emptying liquid present in a keg through said keg tap.

13. The arrangement according to claim 5, wherein said connector comprises a keg tap for commercial, restaurant or food service, non-returnable, plastic kegs.

14. The arrangement according to claim 13, wherein said arrangement further comprises a kit comprising at least two different interchangeable adapters, and wherein said kit comprises:
    a first type of interchangeable adapter configured to fit a flange around the opening of a first keg; and
    a second type of interchangeable adapter configured to fit a flange around the opening of a second keg, wherein the flange of the first keg is different than the flange of the second keg.

15. The arrangement according to claim 14, wherein said keg tap is configured to permit the emptying of liquid present in a keg.

16. The arrangement according to claim 15, wherein:
said keg tap comprises:
    a connector bushing configured to be connected to at least one of: said vacuum device and a gas source configured to pressurize the interior of a keg;
    a lever-actuated valve configured to be opened and closed to release liquid from a keg through said keg tap; and
    a tube configured to conduct liquid out of said keg tap;
said kit comprises a plurality of closure structures configured to close an opening of a volume-reduced keg; and
said closure structures comprise one of: a sealing film, a membrane, a screw cap, and a bayonet closure.

17. The arrangement according to claim 15, wherein:
said keg tap comprises:
    a connector bushing configured to be connected to a gas source configured to pressurize the interior of a keg;
    an additional connector bushing configured to be connected to said vacuum device;
    a lever-actuated valve configured to be opened and closed to release liquid from a keg through said keg tap; and
    a tube configured to conduct liquid out of said keg tap;
said kit comprises a plurality of closure structures configured to close an opening of a volume-reduced keg; and
said closure structures comprise one of: a sealing film, a membrane, a screw cap, and a bayonet closure.

18. The arrangement according to claim 15, wherein:
said keg tap comprises:
    a connector bushing configured to be connected to a gas source configured to pressurize the interior of a keg;
    a lever-actuated valve configured to be opened and closed to release liquid from a keg through said keg tap;
    a tube configured to conduct liquid out of said keg tap; and
    a branch connection configured to connect said tube to said vacuum device;
said kit comprises a plurality of closure structures configured to close an opening of a volume-reduced keg; and
said closure structures comprise one of: a sealing film, a membrane, a screw cap, and a bayonet closure.

19. A method of reducing the volume of non-returnable plastic beverage kegs, said method comprising the steps of:
    using an interchangeable adapter to connect a vacuum arrangement to an opening of a non-returnable plastic beverage keg; and
    evacuating air from said non-returnable plastic beverage keg with said vacuum arrangement and thereby reducing the volume of said non-returnable plastic beverage keg and producing a volume-reduced non-returnable plastic beverage keg.

20. The method of according to claim 19, wherein said non-returnable plastic beverage kegs comprise non-returnable plastic beer kegs.

* * * * *